United States Patent [19]
Craig et al.

[11] 3,940,778
[45] Feb. 24, 1976

[54] PHOTOGRAPH AND NEGATIVE HOLDER

[75] Inventors: Jules M. Craig; Philip Karsted, both of Shingle Springs, Calif.

[73] Assignee: Lawrence Peska Associates, Inc., New York, N.Y. ; a part interest

[22] Filed: Oct. 7, 1974

[21] Appl. No.: 512,471

[52] U.S. Cl. .................. 354/282; 354/354; 40/159
[51] Int. Cl.² ........................................... G09F 1/10
[58] Field of Search ............... 354/282, 354; 40/159

[56] References Cited
UNITED STATES PATENTS

| | | | |
|---|---|---|---|
| 1,950,863 | 3/1934 | Raguin | 354/282 |
| 2,925,675 | 2/1960 | Lumpkin | 40/159 |
| 3,464,135 | 9/1969 | Eidinger | 40/159 |

*Primary Examiner*—John M. Horan

[57] ABSTRACT

A photograph and negative holder providing for display of the photograph and negative in back to back relationship in individual transparent envelopes and including a hinge flap for securing the photographs and a writing surface on one of the surfaces of the envelope.

2 Claims, 3 Drawing Figures

PHOTOGRAPH AND NEGATIVE HOLDER

The present invention relates to a photograph and negative holder, and more particularly to the type of holder which is designed for use in storing, carrying and displaying small snap shot variety photographs and holding the negatives of these photographs.

An extremely common type of photo holder used in photo albums employs between the hinged covers thereof an up and down series of overlapping flat envelopes which are formed of transparent plastic material, are hinged within the album along the fold line between the covers, and are open along their distal or outer side edges in order to provide entrance slots through which a photograph may be inserted.

When a photograph is thus inserted into a given envelope, the photograph is visible from one side of the envelope thru the transparent plastic material of which the envelope is formed. When the album is in its closed condition, the various envelopes overlie one another somewhat like the pages of a book.

The envelopes which are associated with and form parts of such an album invariably does not provide a means for noting what the picture is of, does not provide a place for storing negatives nor is there a way of securing said photographs in the envelope, without using an adhesive material on the photograph.

The present invention is concerned with a novel photograph and negative holder which makes provision for display of the photograph and the negative in a back to back relationship in individual transparent envelopes, one for each photograph and its corresponding negative, and provides a hinge flap for securing the photographs within the envelope and a writing surface on one of the surfaces to note what the photographs are about. The photograph and negative holder may further be comprised of a means for mounting the holder in a photograph album.

The principle object of this invention is to provide a photograph and negative holder which can hold the photograph and negative in a back to back relationship to each other.

A further object of this invention is to provide a photograph and negative holder wherein one can note on a writing surface what the photograph and negative are of or any other notes pertaining to the photograph.

A further object of this invention is to provide a photograph and negative holder which has a hinged flap for securing the photograph and negative in the holder.

A still further object of this invention is to provide a photograph and negative holder with a means for securing said holder in a photograph album.

The above mentioned and other objects, features and advantages of the invention will be apparent from the following detailed description and the accompanying illustrative drawings of a preferred embodiment thereof.

Figure 1:
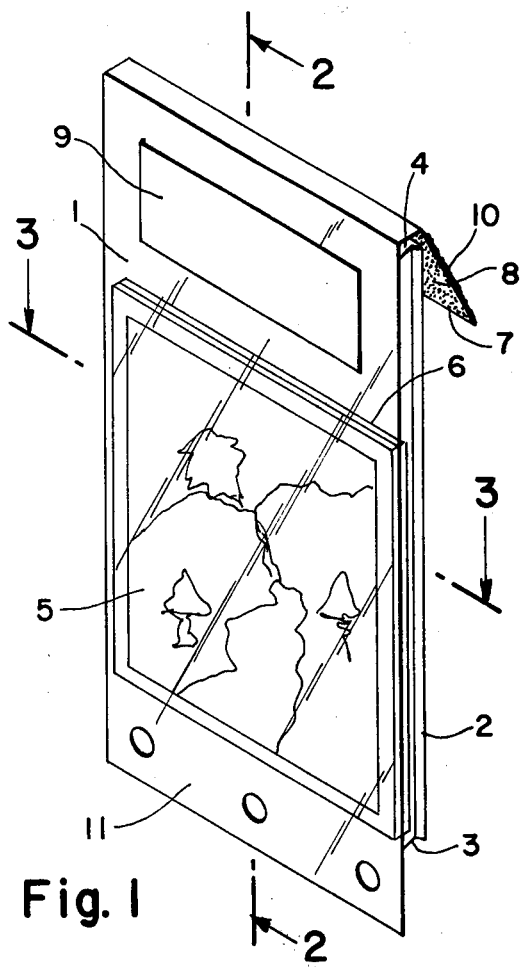
FIG. 1 is a perspective view of the novel photograph and negative holder.
Figure 2:
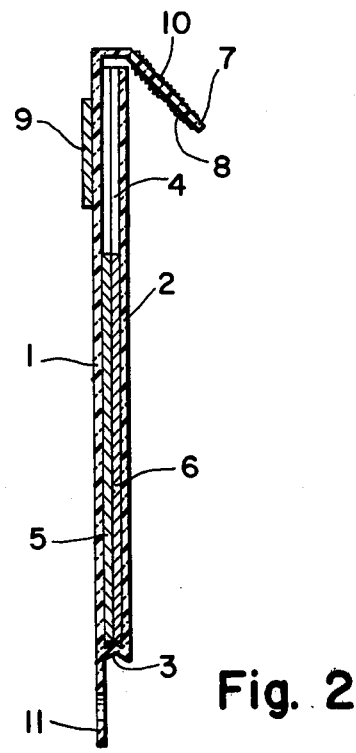
FIG. 2 is a sectional view of a portion of the photograph and negative holder taken approximately along line 2—2 of FIG. 1.
Figure 3:
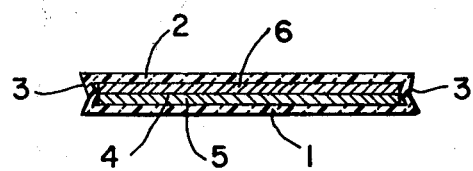
FIG. 3 is a sectional view of the photograph and negative holder taken along line 3—3 of FIG. 1.

As shown in the drawings the photograph and negative holder is comprised of a first sheet 1. The first sheet is made of a transparent material.

The holder is further comprised of a second sheet 2, also made of a flexible transparent material. The first sheet and second sheet are in a superposed relationship with respect to each other.

Along the edge between the first sheet and second sheet is an expandable bellows bonding strip 3. The expandable bellows bonding strip bonds the sheets together at the edge, and can expand to allow for easy insertion of the photograph and negative in the holder.

The first sheet, the bonding strip, and the second sheet define a space 4 of the same size for receiving a photograph 5 and a negative 6 which are in superposed relation to each other.

A hinged flap 7 is attached to the first sheet and overlaps the space and has a securing means 8 which allows the flap to be attached to the second sheet.

The holder is further comprised of a writing surface 9 which allows one to make notes.

In use, one inserts in the photograph and negative holder a photograph and negative which are in a superposed relationship to each other, i.e., back to back, inserts them in the space between the first sheet and the second sheet.

The hinged flap is then brought over and attached to the second sheet to securely hold the photograph and negative in the holder.

The person using the holder may make notes on the writing surface. The holder may have a means for mounting the photographs and negative holder in a photo album 10. This mounting means may be a permanent mounting means, i.e., glued in a photograph album, or it may be a temporary means, removable means, etc., i.e., looseleaf.

The first sheet and the second sheet may be made of any type of transparent material. It may be flexible or it may be a stiff transparent material.

The expandable bellows bonding strip may also be of a transparent material, although this is not necessary.

The hinged flap may also be of transparent material, although this too is not necessary.

It is to be understood that the invention is not limited to details of the illustrated embodiment and that various modifications may be effected therein without departing from the fair scope of the invention, which is intended to be defined by the appended claims.

Having herein described the invention, what is claimed as new is:

1. A photograph and negative holder for displaying a developed photograph and a negative comprising:
   a first sheet of transparent material; a second sheet of transparent material in superposed relation with respect to the first sheet;
   an expandable bellows bonding strip interposed between the first sheet and the second sheet and attached along the edges of the first sheet and the edges of the second sheet;
   whereby the bonding strip, the first sheet and the second sheet define a single envelope having a single opening of sufficient size for receiving the photograph and the negative in contact with each other and in superposed relation to each other;
   a hinged flap having a first end and a second end, the first end attached to the first sheet, which overlaps the opening;

a means for securing the hinged flap, at the second end, to the second sheet;

a writing surface attached to the first sheet and in such a position so as not to obstruct the view of the photograph; and a third sheet attached to the edge of the first sheet and opposite the opening, having a plurality of holes in the third sheet for mounting in a loose-leaf binder.

2. The photograph and negative holder of claim 1, wherein the first sheet, third sheet and hinged flap are constructed of one sheet of transparent material; and the second sheet and bonding strip are constructed of another single sheet of transparent material.

* * * * *